Figure 1:
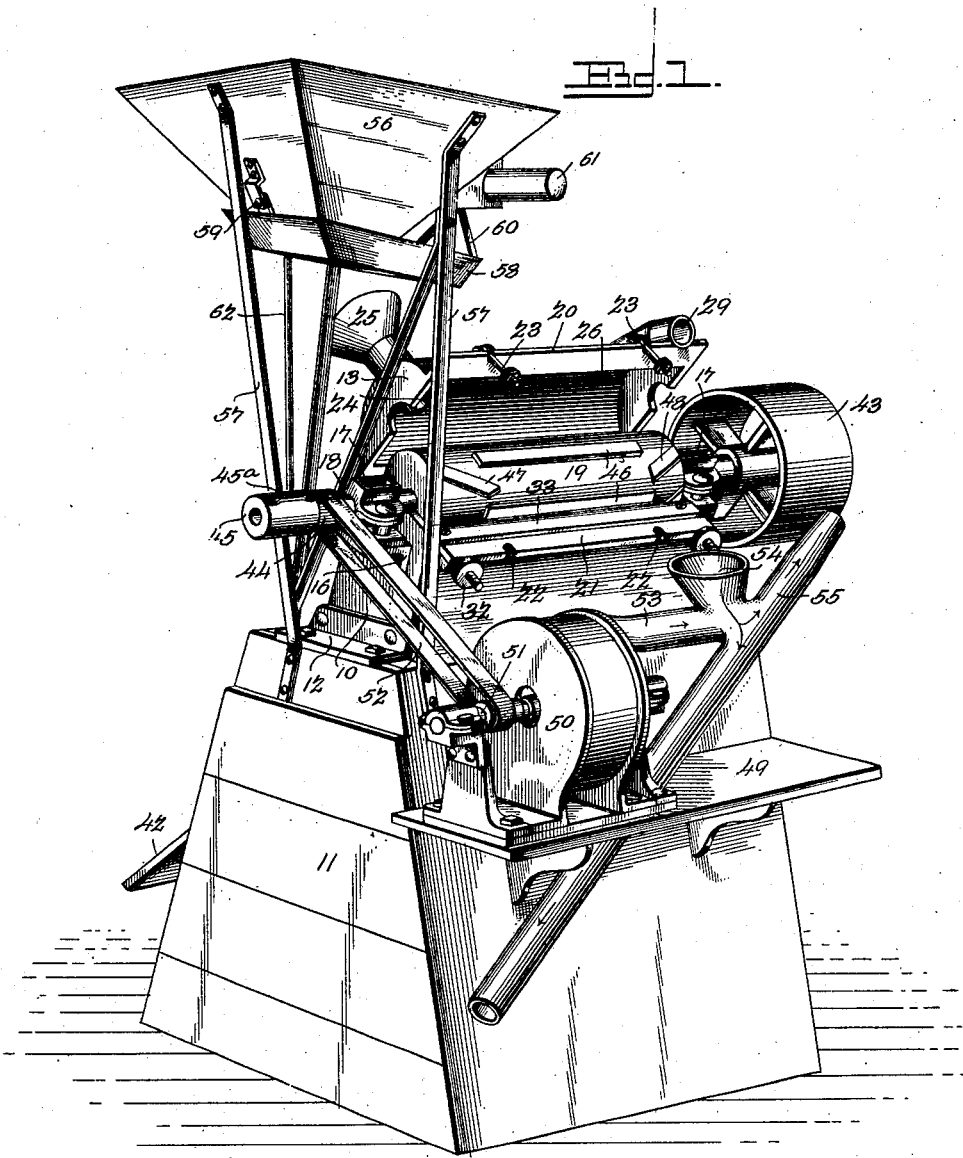

No. 693,930. Patented Feb. 25, 1902.
W. VAN HOUTEN & S. F. PREVATT.
RICE HULLING AND POLISHING MACHINE.
(Application filed July 12, 1900.)

(No Model.) 3 Sheets—Sheet 1.

W. Van Houten and
S. F. Prevatt Inventors

By C. A. Snow & Co.
Attorneys

Witnesses

No. 693,930. Patented Feb. 25, 1902.
W. VAN HOUTEN & S. F. PREVATT.
RICE HULLING AND POLISHING MACHINE.
(Application filed July 12, 1900.)
(No Model.) 3 Sheets—Sheet 2.
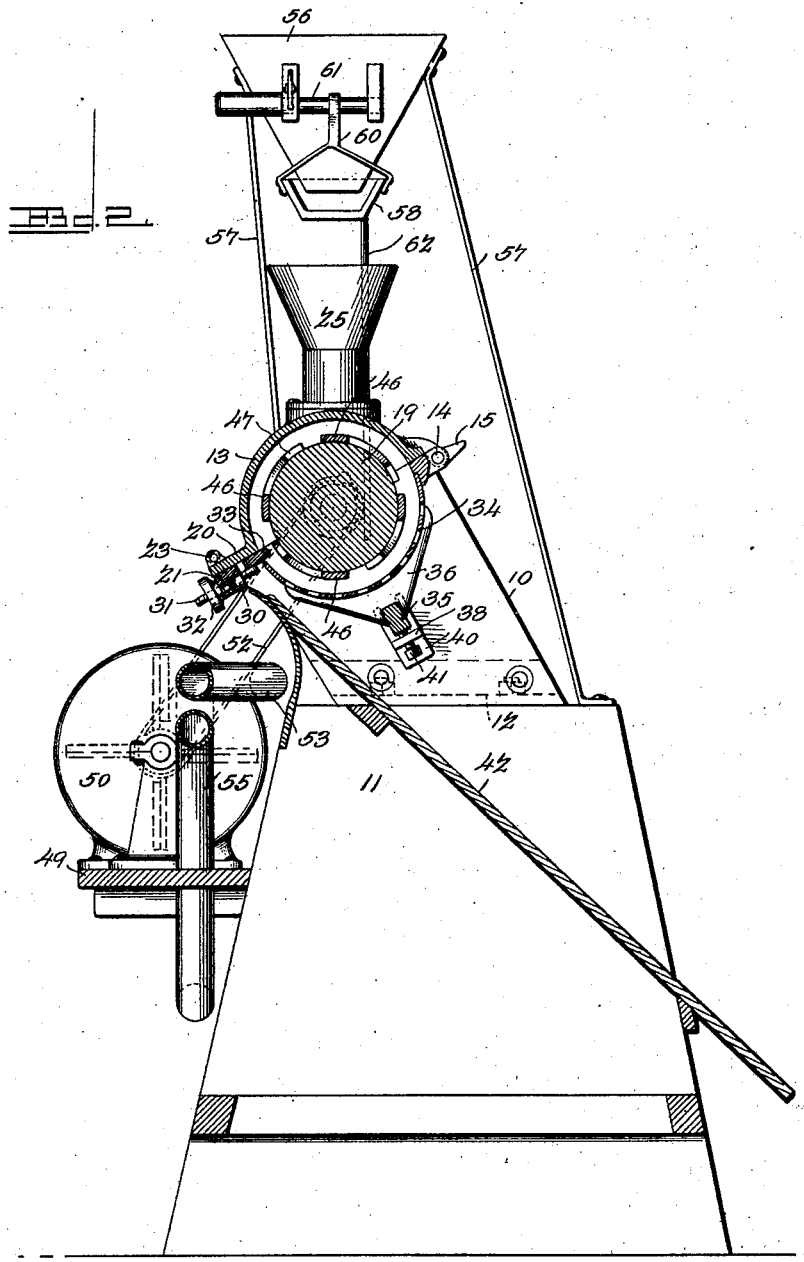
Witnesses
W. Van Houten and
S. F. Prevatt Inventors
By C. A. Snow & Co.
Attorneys No. 693,930. Patented Feb. 25, 1902.
W. VAN HOUTEN & S. F. PREVATT.
RICE HULLING AND POLISHING MACHINE.
(Application filed July 12, 1900.)
(No Model.) 3 Sheets—Sheet 3.
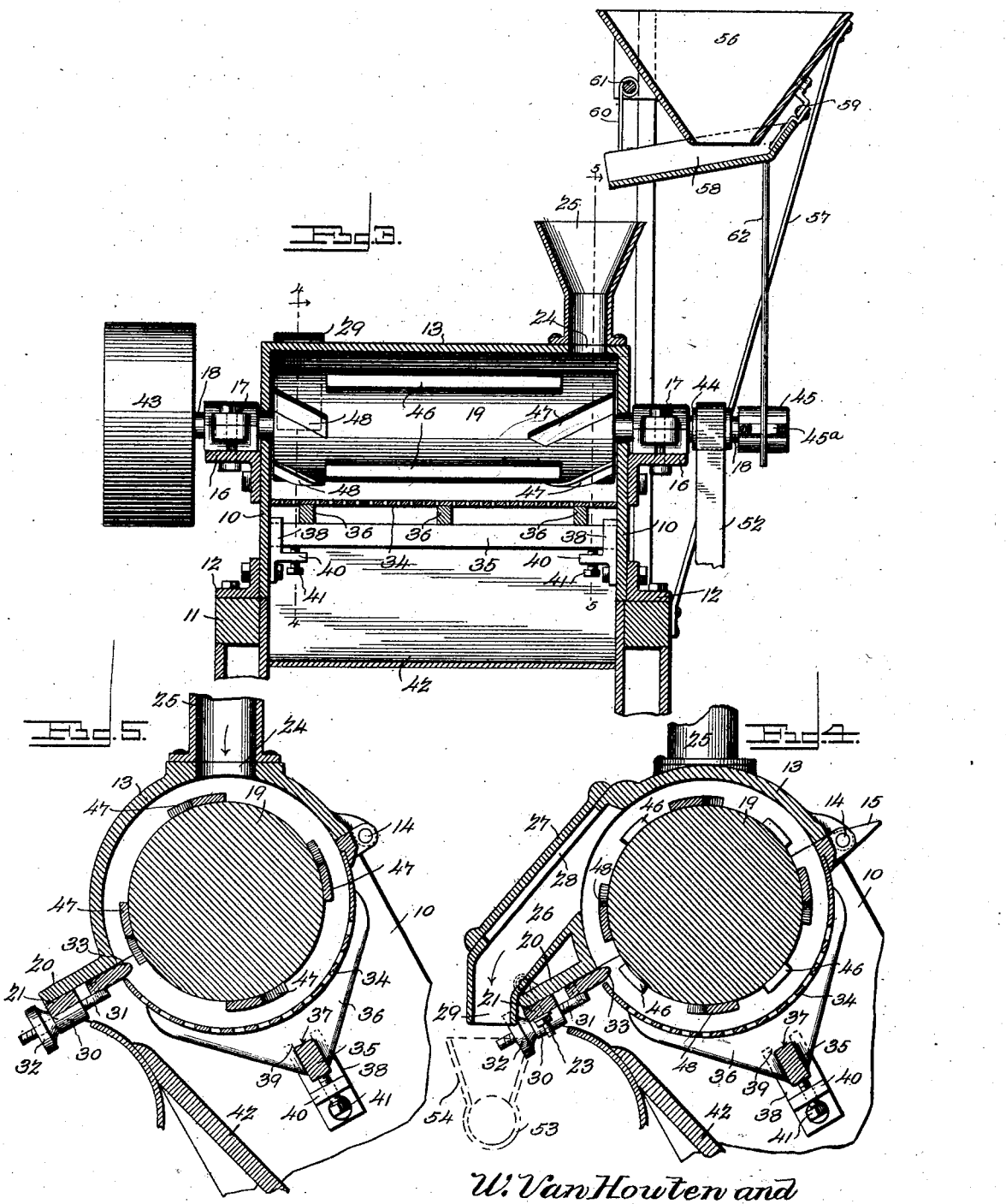
Witnesses
E. F. Stewart
J. W. Gainor
W. Van Houten and
S. F. Prevatt Inventors
By C. A. Snow & Co.
Attorneys

United States Patent Office.

WILLIAM VAN HOUTEN, OF SYCAMORE, AND SIMEON F. PREVATT, OF NASHVILLE, GEORGIA.

RICE HULLING AND POLISHING MACHINE.

SPECIFICATION forming part of Letters Patent No. 693,930, dated February 25, 1902.

Application filed July 12, 1900. Serial No. 23,357. (No model.)

*To all whom it may concern:*

Be it known that we, WILLIAM VAN HOUTEN, residing at Sycamore, in the county of Irwin, and SIMEON F. PREVATT, residing at Nashville, in the county of Berrien, State of Georgia, citizens of the United States, have invented a new and useful Rice Hulling and Polishing Machine, of which the following is a specification.

Our invention is an improved machine adapted to efficiently hull and polish rice and to separate the rice from the chaff, so that the rice is discharged from the machine in condition for the market.

One object of our invention is to effect improvements in the hulling-cylinder to increase the efficiency of the machine.

Another object of our invention is to combine with the hulling and polishing mechanism a blast-fan and flues for winnowing the rice as it is discharged therefrom.

Our invention consists in the peculiar construction and combination of devices hereinafter fully set forth, and pointed out in the claims.

In the accompanying drawings, Figure 1 is a perspective view of a rice hulling and polishing machine constructed in accordance with our invention. Fig. 2 is a vertical sectional view of the same. Fig. 3 is a similar view on a plane at right angles to Fig. 2. Fig. 4 is a detail sectional view taken on the line 4 4 of Fig. 3. Fig. 5 is a similar view taken on the line 5 5 of Fig. 3.

The inclosing casing 10 of the hulling and polishing mechanism is mounted on a suitable supporting-frame 11 and is provided at its ends with angle-plates 12, bolted thereto and to said supporting-frame 11 to secure the inclosing case in place. The upper side of the inclosing case is formed by a semicylindrical cover 13, which is hinged or pivotally connected on one side, as at 14, to the lower portion of the inclosing casing, the said casing 10 having a projecting lug 15, adapted to support the cover 13 when the latter is opened and swung to one side of the casing 10 to uncover the latter. Angle-plates 16 are bolted on the vertical ends of the casing 10, and on the said angle-plates are bolted bearing-blocks 17, in which the shaft 18 of the hulling-cylinder 19 is journaled. The cover 13 is provided at its free side with an extended flange-plate 20, forming an extension thereof. When the cover 13 is closed over the casing, the said plate 20 bears upon a bar 21, which connects the vertical end pieces of the casing 10. The said bar 21 is provided on its outer side with recesses 22, adapted to receive bolts 23, which are pivotally attached to the plate 20 of cover 13 and serve to secure the said cover when the same is closed. The said cover is provided at one end, on its upper side, with a feed-opening 24, with which a feed-hopper 25 communicates, said hopper being secured on the said cover, as shown, and said cover is provided at its opposite end with a discharge-opening 26. A removable plate 27 closes an opening 28 on the upper side of the discharge-opening 26. The latter forms a discharge-spout 29.

The bar 21 is provided on its under side at or near its ends with enlargements 30, in which are openings which receive and support endwise-movable adjusting-bolts 31. The latter are moved longitudinally by thumb-nuts 32, and at their inner ends support a hulling-knife 33, which coacts with the ribs of the hulling-cylinder to hull and polish the rice.

A screen 34, which is substantially semicylindrical in shape, is disposed under the hulling and polishing cylinder and is supported by a bar 35 and a series (any suitable number) of brace-brackets 36, which brackets conform to the contour of the screen and at their outer sides are provided with recesses 37 to receive the bar 35. Bracket-plates 38 are bolted to the inner sides of the vertical end walls of casing 10 and are provided in their upper ends with openings 39 to receive the ends of the supporting-bar 35. The said bracket-plates 38 are further provided with horizontally-disposed lugs 40, in threaded openings in which adjusting-bolts 41 operate, the upper ends of said adjusting-bolts bearing under the supporting-bar 35, and the function of said adjusting-bolts being to secure the screen in place in the position shown in the drawings. An inclined board 42 is disposed under the screen 34 and serves to discharge the screenings.

The cylinder-shaft is provided at one end with a power-pulley 43, adapted to receive power from an endless belt and to impart rotary motion to the cylinder, and the shaft of the latter is provided at the end opposite the power-pulley 43 with a small pulley 44 and a cylindrical drum 45. The latter has a suitable offset 45ª disposed thereon.

The cylinder 19 is provided on its face with a series of longitudinally-disposed hulling and polishing ribs 46, which are parallel with the axis thereof and are located at suitable regular distances apart. At one end of the cylinder are a series of inclined feed-ribs 47, which are disposed opposite the spaces between the ribs 46 and the inner ends of which are disposed in overlapping relation to said ribs 46. A series of discharge-ribs 48 are disposed at the opposite end of the cylinder and are located opposite the spaces between the ribs 46, the proximate ends of said ribs 46 48 being in line with each other, as shown in Fig. 3. The said discharge-ribs are inclined in the reverse direction to the ribs 47. In operation the ribs 47 serve to feed the unhulled rice endwise on the cylinder 19 between the ribs 46, and the said feed-ribs 47 having their inner ends extended between said ribs 46 the efficiency thereof in feeding the rice between said ribs 46 is increased. Owing to the inclination of the discharge-ribs 48, the same tend to retard the longitudinal movement of the rice on the cylinder after the same has traversed the length of the hulling and polishing ribs 46 and by the coaction of said ribs and the knife 33 been thoroughly hulled and polished, and said ribs 48 serve to discharge the hulled and polished rice from the cylinder through the discharge-opening 26 centrifugally, as will be understood. We dispose the inner ends of the discharge-ribs in line with the outer ends of the hulling and polishing ribs 46 in order that the efficiency of the latter in hulling and polishing the rice be not impaired, as would result if the inner ends of the ribs 48 projected between the hulling and polishing ribs, as the said ribs 46 would neutralize the action of the ribs 48, one function of which is to retard the movement of the rice longitudinally of the cylinder. It will be observed by reference to Fig. 3 of the drawings that the obliquely-disposed feed and discharge ribs do not cross the lines which would be formed by extending the axes of the hulling and polishing ribs, but converge thereto and form angles therewith. By this disposition of the feed and discharge ribs 47 48 with relation to the hulling and polishing ribs 46 the passages between the feed and discharge ribs and the ends of the ribs 46 are widened to the fullest extent possible to facilitate the flow of the rice longitudinally of the cylinder at the feed end of the latter and to retard the flow of the rice as it nears the discharge ends of the hulling and polishing ribs, said discharge-ribs being arranged reversely with relation to said feed-ribs, thereby subjecting the rice more thoroughly to the coaction of the hulling and polishing ribs and the knife. By this construction of the cylinder and disposition and arrangement of the ribs 46 47 48 we enable the same, in combination with the knife, screen, and casing, to not only thoroughly hull the rice, but also to polish it at the same operation, thus obviating the necessity heretofore involved of employing a separate machine for polishing the rice after it has been hulled.

On one side of the frame 11 is a platform 49, on one end of which is mounted the casing of a blast-fan 50. The fan-shaft has a pulley 51, which is connected to the pulley 44 of the cylinder-shaft by an endless belt 52, whereby power is communicated from the cylinder-shaft to the blast-fan. A blowpipe 53 leads from the fan-casing and is provided on its upper side with a hopper 54, which hopper is located below the discharge-spout 29 and receives the rice as the same is discharged from the hulling and polishing mechanism. An inclined pipe 55 is connected to the outer end of the blowpipe 53 and is open at its upper and lower ends. In operation the rice which is discharged into the hopper 54 is subjected to the winnowing action of the air-blast from the fan, the chaff being blown from the upper end of the inclined pipe 55 and the winnowed rice descending said pipe 55 and being discharged from the lower end thereof into a suitable receptacle. It will be understood that the machine is not only adapted for hulling and polishing rice, but also effectually winnows the same, so that the rice discharged from the machine is in condition for the market.

We will now describe means for regulating the quantity of rice fed to the hulling and polishing mechanism.

A hopper 56, into which the rough rice is poured, is supported above one end of the machine either by bars 57, as here shown, or by any other suitable means. An inclined feed-trough 58 is disposed under the hopper 56 and adapted to discharge rice from said hopper 56 into the feed-hopper 25 of the hulling and polishing machine. The upper end of the trough 58 is flexibly hung to the hopper 56, as at 59, and the lower end thereof is supported by a strap 60, which is coiled on a winch 61. As here shown, the lower end of the strap is split into two portions, which are attached to opposite sides of the trough 58; but this arrangement is not essential and may be departed from without the exercise of invention. By means of the winch and the strap the trough 58 may be disposed at any required angle in order to cause the same to feed the rice to the hopper 25 at any desired rate, according to the feed and capacities of the hulling and polishing mechanism. A vibrating rod 62 is attached at its upper end to the trough 58 at a point near the upper end of the latter, and the lower end of said vibrating rod 62 bears against one side of the drum 45. The offset 45ª of said drum by engagement with said vibrating rod 62 imparts vibratory motion to the trough 58, thereby causing the rice to pass over said trough, as will be understood.

Having thus described our invention, we claim—

1. In a rice hulling and polishing machine, a hulling and polishing cylinder having a series of longitudinally-disposed hulling and polishing ribs terminating short of the ends of the cylinder and reversely-disposed feed and discharge ribs at and extending inwardly from the ends of the cylinder, arranged obliquely with relation to the hulling and polishing ribs and opposite to the spaces intermediate of the hulling and polishing ribs, the inner ends of said feed-ribs extending past the receiving ends of the hulling and polishing ribs, the inner ends of the discharge-ribs being in the same transverse plane with the discharge ends of the hulling and polishing ribs, the outer ends of said feed and discharge ribs converging to and terminating short of lines which would be formed by extending the axes of the hulling and polishing ribs, substantially as described.

2. In a rice hulling and polishing machine, a hulling and polishing cylinder, having a series of longitudinally-disposed hulling and polishing ribs terminating short of the ends of the cylinder and reversely-disposed feed and discharge ribs at and extending inwardly from the ends of the cylinder, arranged obliquely with relation to the hulling and polishing ribs and opposite to the spaces intermediate of the hulling and polishing ribs, the inner ends of said feed-ribs extending past the receiving ends of the hulling and polishing ribs, the inner ends of the discharge-ribs being in the same transverse plane with the discharge ends of the hulling and polishing ribs, the outer ends of said feed and discharge ribs converging to and terminating short of lines which would be formed by extending the axes of the hulling and polishing ribs, in combination with a casing having feed and discharge openings disposed respectively opposite the feed and discharge ribs, and a blade or knife disposed longitudinally in one side of said casing, and approximate to said cylinder, substantially as described.

3. In a rice-hulling machine, the combination with the hulling mechanism comprising a casing and a cylinder, the said casing having an upper section hinged on one side, and provided on the opposite side with a discharge-spout, a blast-fan having a blast-pipe, and an inclined pipe, the latter open at its upper and lower ends and communicating with the said blast-pipe, and a hopper at the junction of said blast and inclined pipes, said hopper being disposed under the discharge-spout of the hinged upper section of the casing, when the said upper section is closed, substantially as described.

In testimony that we claim the foregoing as our own we have hereto affixed our signatures in the presence of witnesses.

WILLIAM VAN HOUTEN.
SIMEON F. PREVATT.

Witnesses as to signature of William Van Houten:
G. R. WAMBLE,
W. D. FOUNTAIN.

Witnesses as to signature of Simeon F. Prevatt:
A. W. PATTERSON,
J. J. MOORE.